US008060726B2

(12) United States Patent
Ozaki

(10) Patent No.: US 8,060,726 B2
(45) Date of Patent: Nov. 15, 2011

(54) SIMD MICROPROCESSOR, IMAGE PROCESSING APPARATUS INCLUDING SAME, AND IMAGE PROCESSING METHOD USED THEREIN

(75) Inventor: Tomoaki Ozaki, Kawanishi (JP)

(73) Assignee: Ricoh Company, Ltd., Tokyo (JP)

( * ) Notice: Subject to any disclaimer, the term of this patent is extended or adjusted under 35 U.S.C. 154(b) by 367 days.

(21) Appl. No.: 12/038,518

(22) Filed: Feb. 27, 2008

(65) Prior Publication Data

US 2008/0209165 A1    Aug. 28, 2008

(30) Foreign Application Priority Data

Feb. 28, 2007    (JP) ................................. 2007-049387

(51) Int. Cl.
*G06F 15/80*   (2006.01)
*G06F 15/82*   (2006.01)
(52) U.S. Cl. .......................................... 712/22; 712/10
(58) Field of Classification Search ................... 712/10, 712/22
See application file for complete search history.

(56) References Cited

U.S. PATENT DOCUMENTS

| 4,748,585 | A | * | 5/1988 | Chiarulli et al. | ................ | 712/15 |
| 5,410,727 | A | * | 4/1995 | Jaffe et al. | ...................... | 709/234 |
| 5,590,356 | A | * | 12/1996 | Gilbert | ............................ | 712/31 |
| 2003/0151608 | A1 | * | 8/2003 | Chung et al. | ................... | 345/506 |

FOREIGN PATENT DOCUMENTS

| JP | 2002-007359 | 1/2002 |
| JP | 2002-091929 | 3/2002 |
| JP | 2006-260479 | 9/2006 |
| JP | 2006-260479 A | 9/2006 |
| JP | 2007-34473 A | 2/2007 |
| JP | 3971557 | 6/2007 |

* cited by examiner

*Primary Examiner* — Daniel Pan
(74) *Attorney, Agent, or Firm* — Dickstein Shapiro LLP

(57) ABSTRACT

A SIMD microprocessor, which can be included in an image processing apparatus using an image processing method used therein, includes a global processor and multiple processor elements controlled by the global processor. Each single processor element of the multiple processor elements includes multiple operation units. The global processor is configured to control the multiple processing elements to uniformly change a configuration of the multiple operation units in the single processor element to determine a number of data units of operation according to the multiple operation units either operated individually or in cooperation with each other in the single processor element and a width of data processed per data unit of operation performed in the single processor element. A processor element number is assigned per data unit of operation to the single processor element to use for executing an operation.

16 Claims, 12 Drawing Sheets

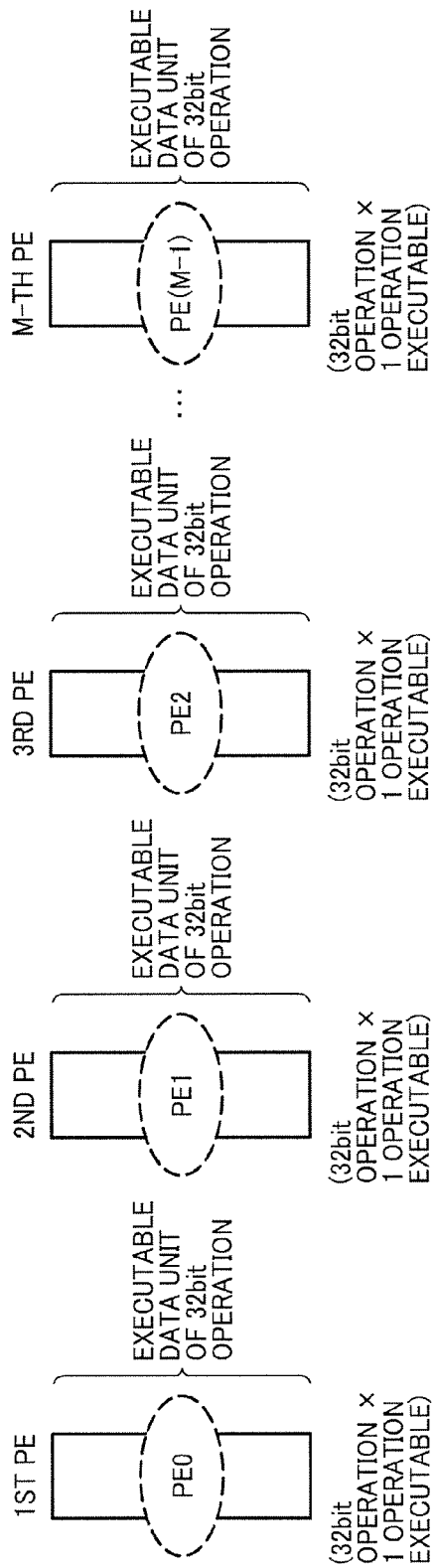
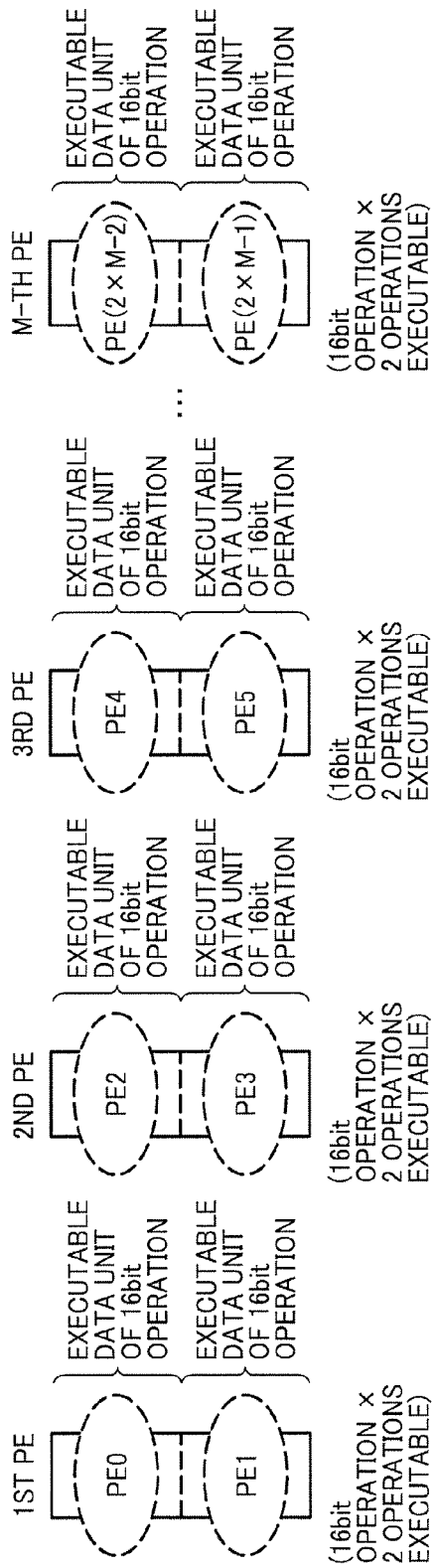
FIG. 4A
FIG. 4B

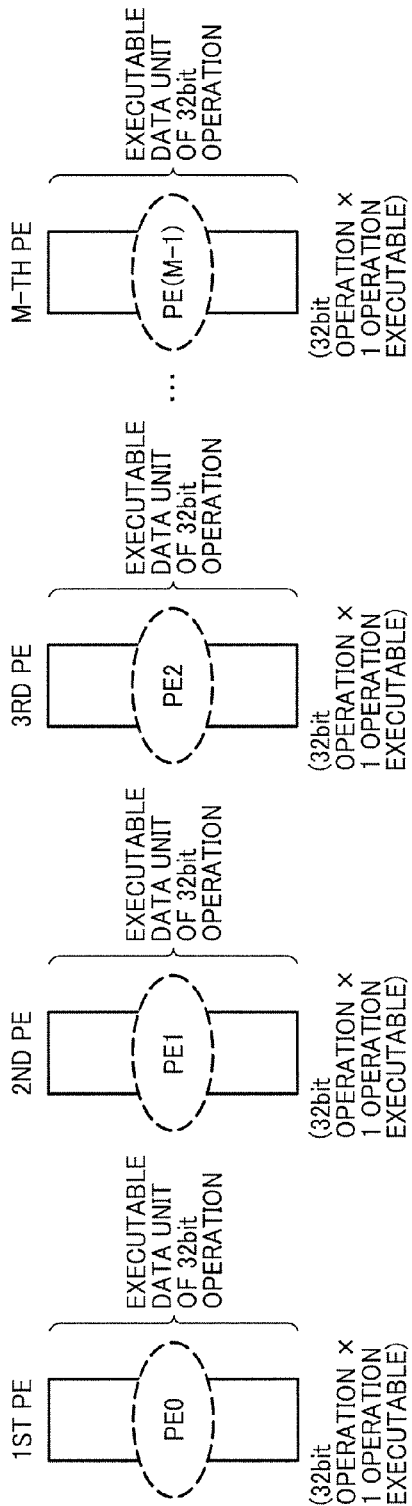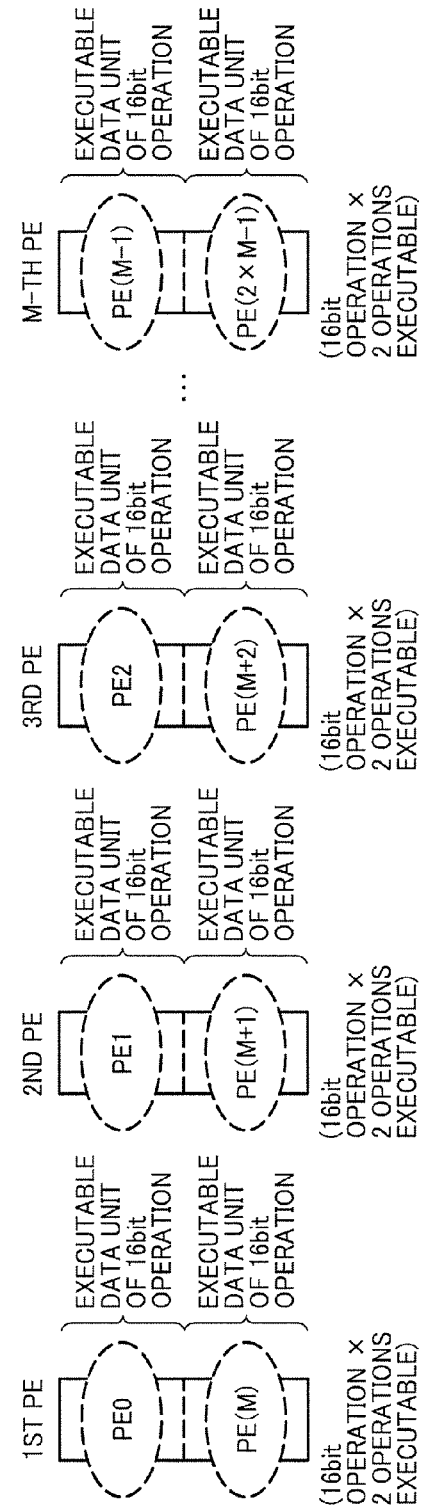

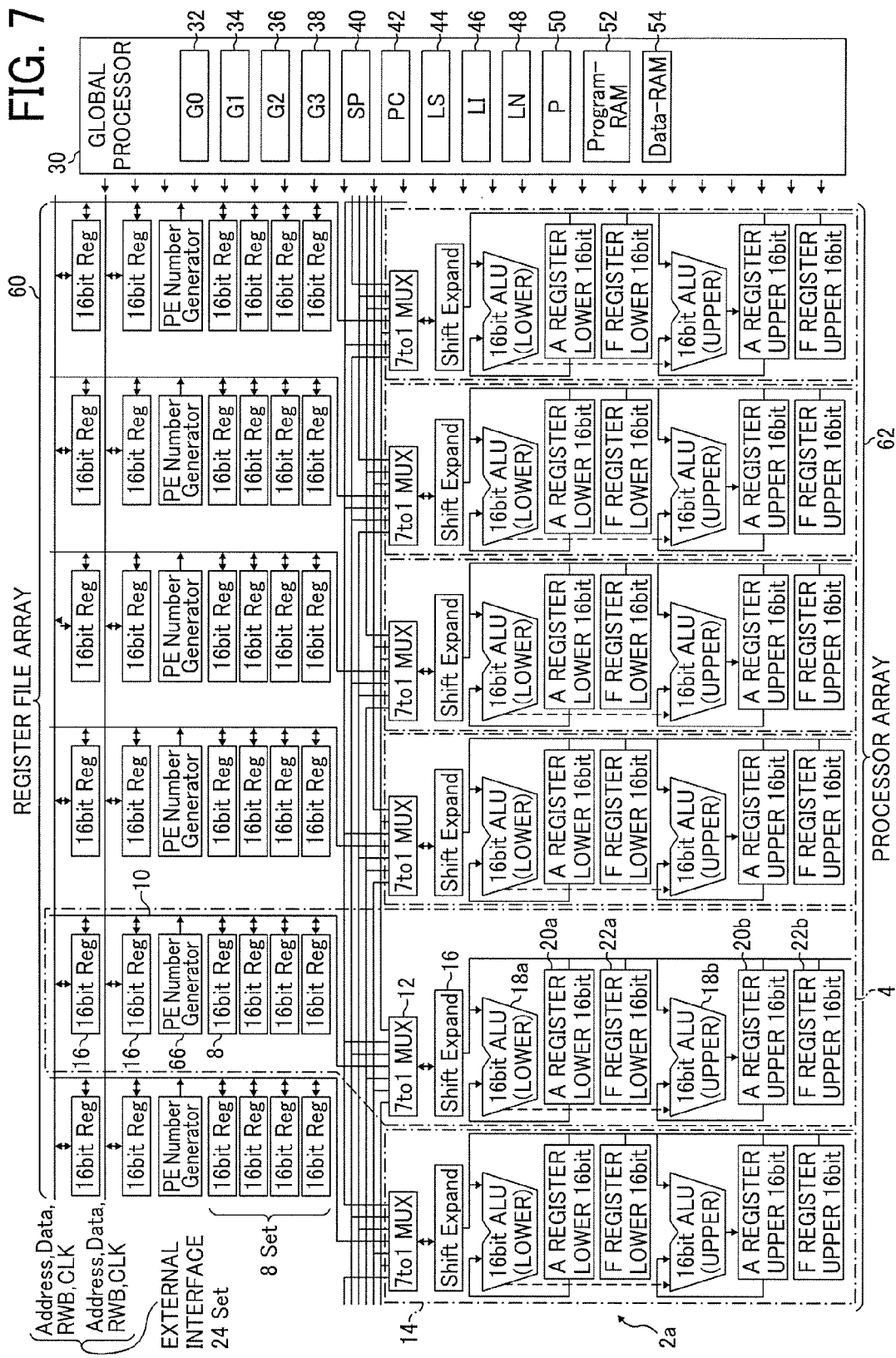

SIMD MICROPROCESSOR, IMAGE PROCESSING APPARATUS INCLUDING SAME, AND IMAGE PROCESSING METHOD USED THEREIN

This application claims priority from Japanese Patent Application No. 2007-049387, filed on Feb. 28, 2007 in the Japan Patent Office, the entire contents of which are incorporated by reference herein.

BACKGROUND OF THE INVENTION

1. Field of the Invention

The present patent specification relates to a single instruction, multiple data (SIMD) microprocessor, an image processing apparatus including same, and an image processing method used therein, and more particularly, to a SIMD microprocessor having multiple processor elements with multiple operation units, an image processing apparatus including the SIMD microprocessor, and an image processing method used in the SIMD microprocessor.

2. Discussion of the Background

A SIMD microprocessor sends a single instruction to multiple data to allow the multiple data to perform an identical action simultaneously. This architecture has now become widespread for use in operation of a large number of data with a single identical processing instruction, for example, image processing in a digital copier.

Such a SIMD microprocessor may include multiple processor elements or PEs, each including multiple operation units. In regular image processing, the SIMD-type processor generally aligns the multiple processor elements along a main scanning direction so as to have an identical action performed simultaneously on multiple data and achieve high-speed processing. Accordingly, the number of multiple processor elements included in the SIMD-type processor is one of most important elements to determine processing speed in image processing.

At the same time, there is increasing demand for ever higher image quality of images output from image processing apparatuses. Such improvement in performance relies significantly on bit width of operation data that is simultaneously processed in each processor element. That is, where a processing operation circuit and a data storage circuit included in a single processor element have a large bit width that can increase the accuracy of an operation, the quality of the output image can improve.

However, in terms of circuit unit size, there is a trade-off between an increase in the number of processor elements to increase operation speed and an increase in the bit widths of operation circuits and of data storage circuits to increase operation accuracy. Accordingly, it is important to appropriately analyze the contents of target image processing and construct a system to capable of performing such image processing properly.

One suggested approach is to have a SIMD-type processor including multiple operation circuits in each processor element so as to cause the multiple operation circuits to operate individually or cooperate with each other according to an operation condition. By so doing, the actual number of processor elements involved, and thus the bit width, can be changed.

Such a SIMD-type processor having the above-described configuration may have processor element (PE) numbers that are assigned in ascending order to each processor element, for example. Since each processor element includes multiple operation circuits, the relation between the PE number and the data unit of operation may depend on the configuration of the operation circuits. That is, some configurations of the operation circuits may not have a one-to-one relation between the PE number and the data unit of operation. The PE number is useful to designate specific image data, and therefore it is necessary that the relation between the PE number and the data unit of operation be 1:1.

Another approach is to have a SIMD-type processor having a different configuration to use a PE number assigned to each processor element for controlling the SIMD operation so that the operation can become more efficient. The PE number assigned to each processor element may be a fixed number.

Yet another approach is to have a SIMD-type processor having a configuration in which multiple processor elements are divided into several groups to share the use of hardware resources such as processor element local memories included in the groups so that the multiple processor elements can be effectively used as a whole processor. The SIMD-type processor having the above-described configuration may use a method for providing an identification code for designating a specific processor element within the multiple processor elements included in the groups. The identification codes may be provided to each group in an identical alignment. Therefore, an identical operation can be executed by the multiple processor elements in all groups having the identical identification code.

Further, yet another approach is to have a SIMD-type processor having a configuration in which each processor element is provided with an individual constant register for setting a unique value for the processor element from an external device. By using the individual constant register to control the SIMD operation, a unique operation may be performed by each processor element.

SUMMARY OF THE INVENTION

This patent specification describes a SIMD microprocessor that can be included in an image processing unit and perform an image processing method therein. The SIMD microprocessor can perform a SIMD operation per data unit of operation even when each single processor element included in the SIMD microprocessor includes multiple data units of operation.

In one embodiment, the novel SIMD microprocessor, which causes the multiple operation units or circuits to operate individually or cooperate with each other according to operation conditions to appropriately generate processor element numbers and properly control the entire operations by using the processor element numbers, includes a global processor and multiple processor elements controlled by the global processor. Each single processor element of the multiple processor elements includes multiple operation units. The global processor is configured to uniformly change a configuration of the multiple operation units in the single processor element to determine a number of data units of operation according to the multiple operation units either operated individually or in cooperation with each other in the single processor element and a width of data processed per data unit of operation performed in the single processor element. A processor element number is assigned per data unit of operation to the single processor element to use for executing an operation.

The processor element number may be generated as one of the data processed per data unit of operation performed in the single processor element.

The processor element number may be used to determine an area with respect to each data unit of operation of the single processor element executed according to a designation specified by the global processor.

The single processor element may include two operation units. The above-described novel SIMD microprocessor selectively may perform one of a first processor element numbering, a second processor element numbering, and a third processor element numbering controlled by the global processor. The first processor element numbering may assign an identical processor element number to the two operation units included in the single processor element either in ascending order or in descending order with respect to a neighboring processor element, when two data units of operation cooperate with each other in the single processor element to execute an operation. The second processor element numbering may assign first processor element numbers different from each other to the two operation units included in the single processor element either in ascending order or in descending order with respect to the two operation units and then assign second processor element numbers different from each other and consecutive to the first processor element numbers to two operation units included in a neighboring single processor element either in ascending order or in descending order with respect to the two operation units in the neighboring single processor element, when two data units of operation operate individually in the single processor element to execute an operation. The third processor element numbering may assign two processor element numbers identical to each other to the two operation units included in the single processor element either in ascending order or in descending order with respect to a neighboring processor element, when two data units of operation operate individually in the single processor element to execute an operation.

Each of the two operation units included in the single processor element may include a determination unit configured to determine whether the processor element number assigned to the single processor element is provided within a selection area specified by the global processor. The processor element number may be assigned to the two operation units included in the single processor element according to the second processor element numbering. When executing either the first processor element numbering or the third processor element numbering, a designated value residing within the selection area sent from the global processor may be multiplied by two to provide a resulting value to each of the two operation units included in the single processor element, and the determination unit provided to each of the two operation units included in the single processor element may ignore a least significant bit.

This patent specification further describes an image processing apparatus including the above-described SIMD microprocessor.

This patent specification further describes an image processing method performed in the above-described novel SIMD microprocessor included in the above-described novel image processing apparatus.

In one embodiment, the novel image processing method includes uniformly changing a configuration of the multiple operation units in the single processor element, determining a number of data units of operation according to the multiple operation units either operated individually or in cooperation with each other in the single processor element and a width of data processed per data unit of operation performed in the single processor element, assigning a processor element number per data unit of operation to the single processor element, and executing an operation using the assigned processor element number.

The above-described novel image processing method may include generating the processor element number as one of the data processed per data unit of operation performed in the single processor element.

The above-described novel image processing method may include using the processor element number to determine an area with respect to each data unit of operation of the single processor element executed according to a designation specified by the global processor.

The above-described novel image processing method may include selectively performing one of a first assigning (1), a second assigning (2), and a third assigning (3) to the single processor element including two operation units under a control by the global processor, (1) assigning an identical processor element number to the two operation units included in the single processor element either in ascending order or in descending order with respect to a neighboring processor element, when two data units of operation cooperate with each other in the single processor element to execute an operation, (2) assigning first processor element numbers different from each other to the two operation units included in the single processor element either in ascending order or in descending order with respect to the two operation units and then assigning second processor element numbers different from each other and consecutive to the first different processor element numbers to two operation units included in a neighboring single processor element either in ascending order or in descending order with respect to the two operation units in the neighboring single processor element, when two data units of operation operate individually in the single processor element to execute an operation, and (3) assigning two processor element numbers identical to each other to the two operation units included in the single processor element either in ascending order or in descending order with respect to a neighboring processor element, when two data units of operation operate individually in the single processor element to execute an operation.

The above-described novel image processing method may include determining whether the processor element number assigned to the single processor element is provided within a selection area specified by the global processor, and assigning the processor element number to the two operation units included in the single processor element according to the second assigning (2).

The above-described novel image processing method may include, when performing either the first assigning (1) or the third assigning (3), multiplying a designated value residing within the selection area sent from the global processor by two to provide a resulting value to each of the two operation units included in the single processor element, and ignoring a least significant bit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is a drawing showing a logical configuration of processor element numbers of the processor elements in the SIMD microprocessor of FIG. 1 under an operation condition;

FIG. 4B is a drawing showing a logical configuration of the processor element numbers of the processor elements in the SIMD microprocessor of FIG. 1 under an operation condition different from the operation condition of FIG. 4A;

FIG. 6A is a drawing showing a logical configuration of the processor element numbers of the processor elements in the SIMD microprocessor under the operation condition of FIG. 4A;

FIG. 6B is a drawing showing a logical configuration of the processor element numbers of the processor elements in the SIMD microprocessor under an operation condition different from the operation condition of FIG. 6A;

FIG. 7 is a detailed configuration of a SIMD microprocessor according to an example embodiment of the present patent specification;

DETAILED DESCRIPTION OF PREFERRED EMBODIMENTS

Figure 1:
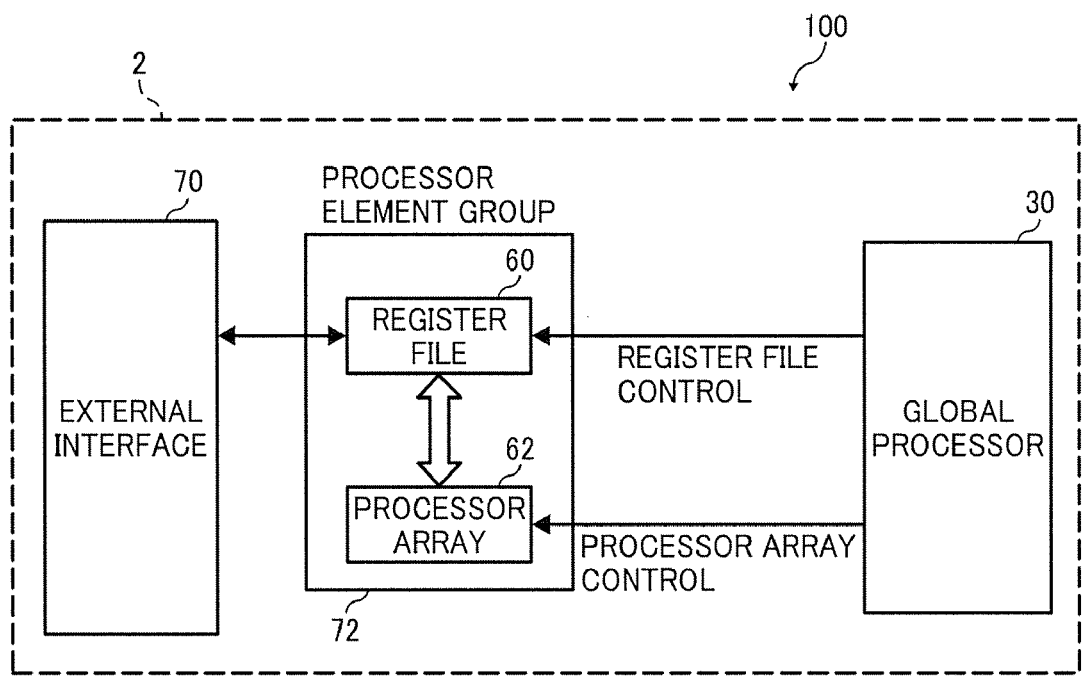
FIG. 1 is a block diagram showing a schematic diagram of a SIMD microprocessor according to an example embodiment of this patent specification.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1, a block diagram showing a schematic diagram of a single instruction, multiple data type processor or SIMD microprocessor 2 according to an example embodiment of this patent specification is described. As shown in FIG. 1, the SIMD microprocessor 2 may be included in an image processing apparatus 100.

The SIMD microprocessor 2 included in the image processing apparatus 100 of FIG. 1 includes, for example, a global processor 30, a processor element group 72, and an external interface 70.

The global processor 30 may be a single instruction, single data type processor or SISD processor that decodes a program to generate various control signals.

The processor element group 72 may be a group of arrays of multiple processor elements having processors and registers as operation units. The processors of each processor element may reside in a processor array 62 and the registers of each processor element may reside in a register file 60.

The processor array 62 may perform processing according to processor element (PE) instructions.

The register file 60 may store data processed by PE instructions.

The external interface 7 may be connected to the register file 60.

Figure 2:
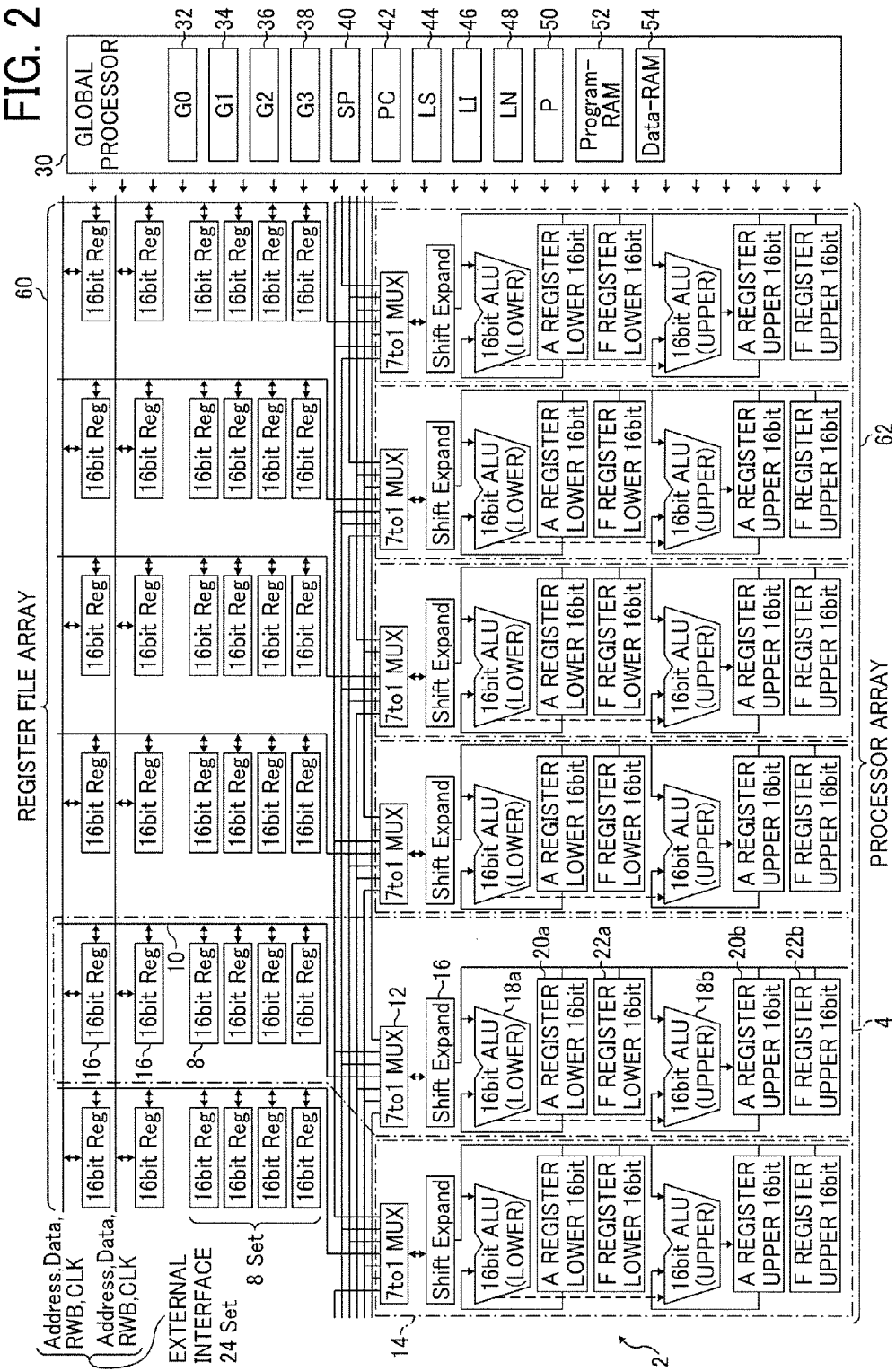
FIG. 2 is a detailed configuration of the SIMD microprocessor of FIG. 1.

Referring now to FIG. 2, a detailed structure of the SIMD microprocessor 2 according to an example embodiment of this patent specification is described.

FIG. 2 mainly shows six processor elements 4 (shown as "PE" in FIG. 2) that are aligned in the vicinity of the center portion of the processor element group 72. The part surrounded by an alternate long and short dash line and indicted with reference numeral "4" corresponds to a single processor element.

The global processor 30 shown on the right-side part of FIG. 2 includes a program random access memory or program RAM 52 and a data random access memory or data RAM 54 as built-in memories. The program RAM 52 stores programs for the SIMD microprocessor 2. The data RAM 54 stores operation data.

The global processor 30 further includes, as built-in elements: a program counter 42 (shown as "PC" in FIG. 2) for storing a program address; general purpose registers 32 through 38 (shown as "G0", "G1", "G2", and "G3" in FIG. 2) for storing operation data; a stack pointer 40 (shown as "SP" in FIG. 2) for containing an address or addresses of the data RAM to which data are saved and stored at the time of saving and restoring a register; a link register 44 (shown as "LS" in FIG. 2) for containing an address or addresses of the position of a call source at the time of subroutine call; an LI register 46 (shown as "LI" in FIG. 2) and an LN register 48 (shown as "LN" in FIG. 2) for containing addresses of a branch source at the time of interrupt request or IRQ and non-maskable interrupt request or NMI; and a processor status register 50 (shown as "P" in FIG. 2) for storing the status of a processor.

The instructions of the global processor 30, which may be called as the GP instructions, are executed by using these registers, an instruction decoder (not shown), an arithmetic logical unit or ALU (not shown), a memory control circuit (not shown), an interruption control unit (not shown), an external input/output or I/O control circuit (not shown), and a general purpose (GP) arithmetic control circuit (not shown).

At the time of executing the instructions of the processor element, which is called as the PE instructions, the global processor 30 uses the instruction decoder, a register file control circuit (not shown), and a processor element (PE) arithmetic control circuit (not shown) to control the register file 60 and the processor array 62.

In the register file 60, each processor element includes multiple 16-bit registers 8 and 16 that are arranged in groups corresponding to the number of processor elements, to form an array configuration. Each of the 16b-bit registers 8 and 16 is provided with a port for the processor array 62. The processor array 62 may access the 16-bit registers 8 and 16 via a 16-bit read/write bus. Hereinafter, the 16-bit read/write bus is referred to as a "register bus." As a matter of convenience, each processor element 4 shown in FIG. 2 includes six of the 16-bit registers 8 and 16.

Each of the processor elements 4 includes an arithmetic part 14, which is surrounded by an alternate long and short dash line and indicated by reference numeral 14 in FIG. 2. The arithmetic part 14 of each processor element 4 includes two sets of 16-bit ALUs 18a and 18b, 16-bit A registers 20a and 20b, and 16-bit F registers 22a and 22b. One set is for processing upper bit data (high order data) and the other set is for processing lower bit data (low order data).

Specifically, the arithmetic part 14 includes a lower 16-bit ALU 18a, an upper 16-bit ALU 18b, a lower 16-bit A register 20a, an upper 16-bit A register 20b, a lower 16-bit F register 22a, and an upper 16-bit F register 22b.

Basically in an operation process by a processor element (PE) instruction, the data read out from the register file 60 is input to one of the ALUs 18a and 18b and the data inside a corresponding one of the A registers 20a and 20b is input to the other one of the ALUs 18a or 18b. The operation results are stored in the A register 20a and 20b. That is, an operation process is performed with the data in the A registers 20a and 20b and the 16 bit-registers 8 and 16.

Each of the lower ALU 18a and the upper ALU 18b can respectively perform a 16-bit operation. Further, the lower ALU 18a for lower bit data and the upper ALU 18b for upper bit data are designed to cooperate with each other.

Therefore, by combining the lower ALU 18a and the upper ALU 18b, a 32-bit operation can also be achieved. Each of the lower ALU 18a and the upper ALU 18b is controlled by the global processor 30. Further, a pathway of communication may be provided between the lower ALU 18a and the upper ALU 18b so that the cooperative operation may be performed therebetween.

7 to 1 multiplexers 12 are provided for 7-to-1 selection (shown as "7 to 1 MUX" in FIG. 2) Each of the 7 to 1 multiplexers 12 has a width of 16 bits and is provided at the connection part between the 16-bit registers 8 and 16 of the register file 60 and the arithmetic parts 14 of the processor array 62. Each of the 7 to 1 multiplexers 12 may be connected to the register bus 10 corresponding to its own processor element 4 (local processor element) and the register buses 10 corresponding to adjacent processor elements that are aligned along the lateral direction in FIG. 2. In this example embodiment, each of the 7 to 1 multiplexers 12 is connected to the register bus 10 corresponding to its own processor element (local processor element) 4, the register buses 10 corresponding to the three processor elements 4 (the first left processor element 4, the second left processor element 4, and the third left processor element 4) aligned on its left side, and the register buses 10 for the three processor elements 4 (the first right processor element 4, the second right processor element 4, and the third right processor element 4) aligned on its right side. Accordingly, the data in the registers corresponding to the register buses 10 are selected as the target to which the operation is performed. The global processor 30 controls the above-described selection of the operation target.

A shifter 16 (shown as "Shift Expand" in FIG. 2) is provided between the 7 to 1 multiplexer 12 and the lower and upper ALUs 18a and 18b. The shifter 16 may perform bit shift and bit expansion on the data read out from the 16 bit registers 8 and 16. The global processor 30 controls the bit shift and the bit expansion of the shifter 16.

The two upper registers 16 included in the register file 60 are registers to which reading and writing of data from an external memory data transfer device, not shown, outside the microprocessor 2 is performed. The two upper registers 16 can perform reading and writing of an arbitrary 16-bit register 16 by using data buses and control signals from the external memory data transfer device outside the SIMD microprocessor 2. The external memory data transfer device can access to the arbitrary 16-bit register 16 by using addresses, which is similar to making an access to a memory.

The 16-bit registers 16 that are accessible from the external memory data transfer device are provided with respective addresses. The external memory data transfer device may output a control signal including an address dedicated to a 16-bit register 16 to be accessed. The 16-bit register 16 connected to this register bus 10 may compare its own address or local address with the address of the 16-bit register 16 to which the external memory data transfer device is making an access. When these addresses match, the 16-bit register 16 may give the external memory data transfer device an allowance of an access to the optional 16-bit register 16.

Next, a logical configuration of an identifier or identifiers of each processor element in the SIMD microprocessor 2 according to the example embodiment of the present patent specification is described with reference to FIGS. 3A and 3B.

As previously described with reference to FIG. 2, the SIMD microprocessor 2 according to this example embodiment of the present patent specification includes two data units of operation, each data unit being executable of 16-bit arithmetic operation. These two data units of operation may operate individually or cooperate with each other. Therefore, these two data units of operation can perform the following two different operations, under control of the global processor 30:

Operation Condition A: Execute one 32-bit arithmetic operation per processor element;

Operation Condition B: Execute two 16-bit arithmetic operations at a time per processor element.

Generally, a unique identifier is assigned to each processor element so as to designate a specific processor element. As previously described, when one arithmetic operation is executed in a single processor element, a data unit of operation of the processor element and an identifier assigned to the processor element may have a one-to-one relation. That is, a single processor element may have one data unit of operation with one identifier assigned thereto.

However, the SIMD microprocessor 2 according to this example embodiment of the present patent specification may execute two or more arithmetic operations in a single processor element at the same time, such as the above-described Operation Condition B. Therefore, the relation between the data unit of operation of the processor element and the identifier assigned to the processor element may not be 1:1. According to the above-described condition, the SIMD microprocessor 2 of this example embodiment of the present patent specification may be configured to assign an identifier by each possible or executable data unit of operation in a single processor element. That is, one or more different identifiers may be assigned to corresponding one or more different data units of operation in a single processor element, depending on whether the above-described SIMD microprocessor 2 executes Operation Condition A or Operation Condition B.

Figure 3A:
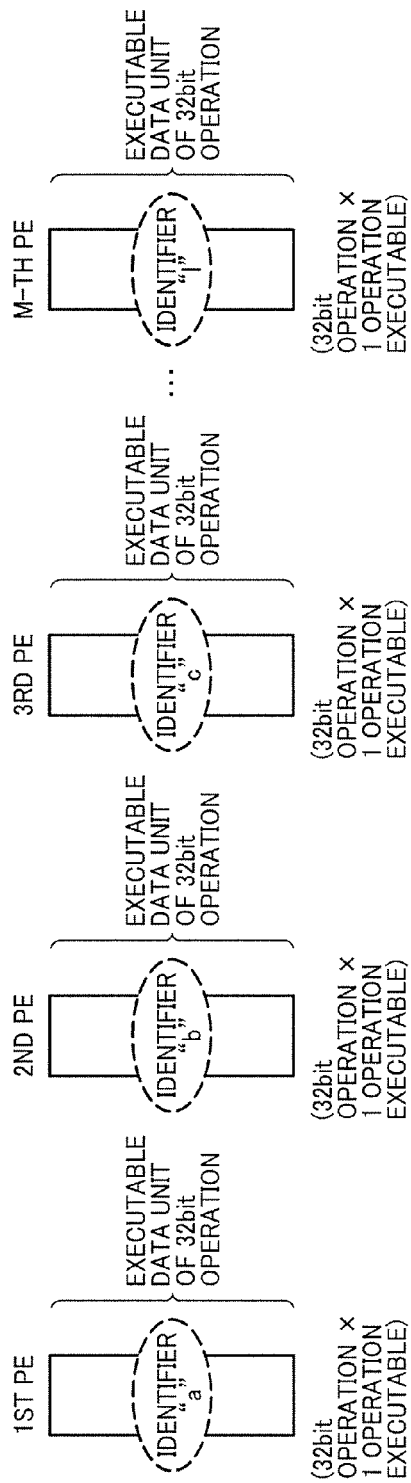
FIG. 3A is a logical configuration of identifiers of each processor element in the SIMD microprocessor of FIG. 1.
Figure 3B:
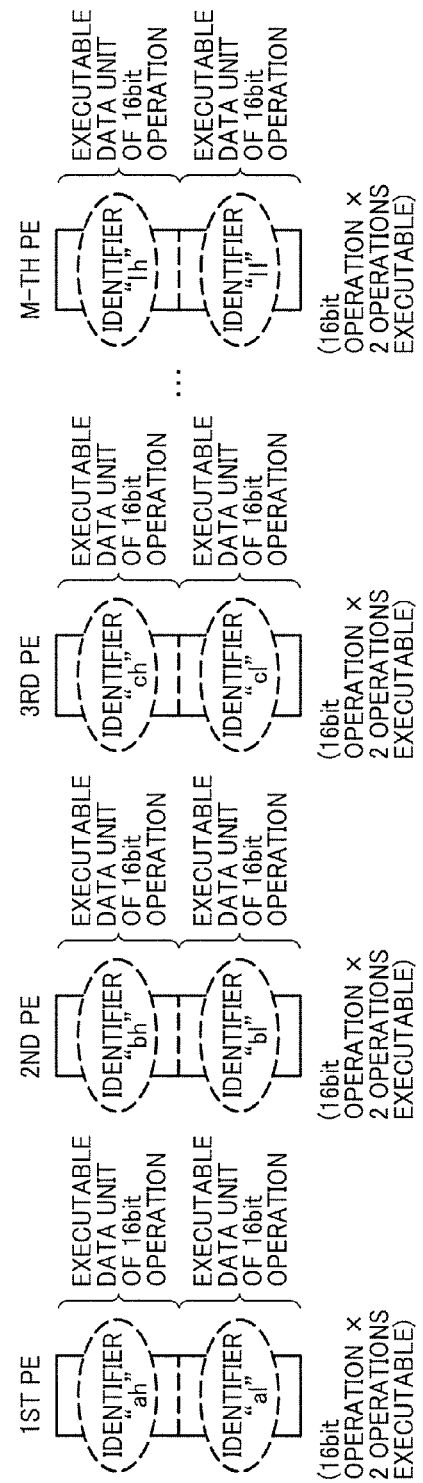
FIG. 3B is a drawing showing a different logical configuration of identifiers of processor elements in the SIMD microprocessor of FIG. 1.

FIGS. 3A and 3B are drawings schematically showing assignments of identifiers when the SIMD microprocessor 2 is under Operation Condition A and Operation Condition B. That is, FIG. 3A is a drawing of the processor elements for Operation Condition A, where identifiers {a, b, c, . . . , l} are assigned in good order corresponding to M data units of operation included in M processor elements. "M" corresponds to any natural number greater than 1. FIG. 3B is a drawing of the processor elements for Operation Condition B, where identifiers {al, ah, bl, bh, cl, ch, . . . , ll, lh} are assigned in good order corresponding to M×2 data units of operation included in M processor elements.

Identifiers for the processor elements 4 and the data units of operation shown in FIGS. 3A and 3B are generally assigned in ascending order. Hereinafter, in the present patent specification, identifiers will be assigned in ascending order and be referred to as a "PE number" for a processor element number. Therefore, FIGS. 4A, 4B, 5A, 5B, 6A, and 6B with respect to this example embodiment show logical configurations of the identifiers (or the PE numbers) being attached to the respective processor elements 4 or respective data units of operation of each processor element 4, with the PE numbers in ascending order, in the SIMD microprocessor 2 according to the example embodiment of the present patent specification.

However, it is noted that the PE numbers or the identifiers for the processor elements 4 in the SIMD microprocessor 2 may also be assigned in descending order in the present patent specification.

FIG. 4A is a drawing showing a logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition A. In FIG. 4A, the data units of operation and the processor elements 4 have a one-to-one relation, and therefore the PE numbers {0, 1, 2, . . . M−1}, for example, are assigned in good order to M data units of operation of M processor elements 4. "M" corresponds to any natural number greater than 1.

FIG. 4B is a drawing showing another logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition B. In FIG. 4B, the PE numbers {0, 1, 2, . . . , 2×M−1}, for example, are assigned in good order to M×2 data units of operation of M processor elements 4.

In FIG. 4B, for example, two PE numbers are assigned in ascending order to respective two data units of operation included in a single processing element, then the following two PE numbers are assigned in ascending order to respective two data units of operation included in a neighboring or adjacent processing element (on its right side in FIG. 4B).

Figure 5A:
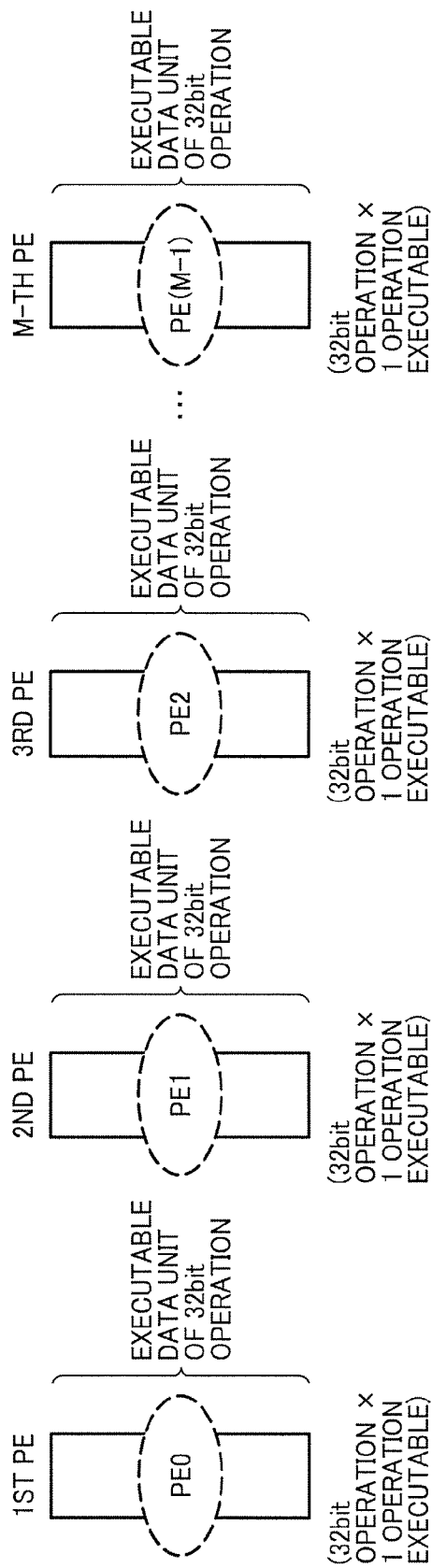
FIG. 5A is a drawing showing a logical configuration of the processor element numbers of the processor elements in the SIMD microprocessor under the operation condition of FIG. 4A.

Next, FIG. 5A is a drawing showing a logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition A. FIG. 5A is basically same as FIG. 4A. In FIG. 5A, the data units of operation and the processor elements 4 have a one-to-one relation, and therefore the PE numbers {0, 1, 2, . . . , M−1}, for example, are assigned in good order to M data units of operation of M processor elements 4. "M" corresponds to any natural number greater than 1.

Figure 5B:
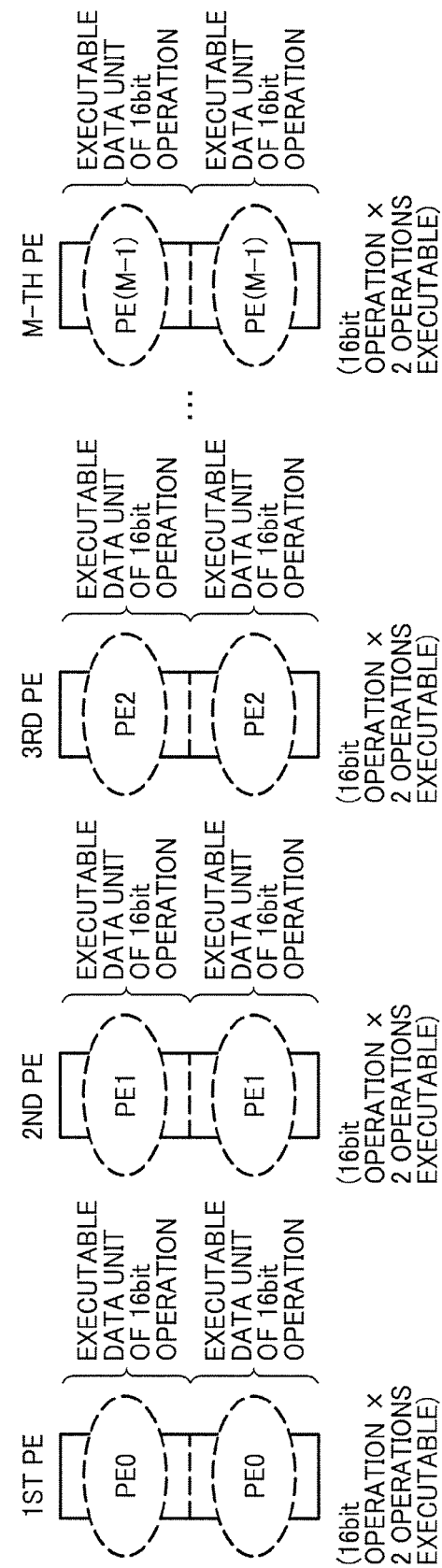
FIG. 5B is a drawing showing a logical configuration of the processor element numbers of the processor elements in the SIMD microprocessor under an operation condition different from the operation condition of FIG. 5A.

FIG. 5B is a drawing showing yet another logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition B. In FIG. 5B, the PE numbers {0, 1, 2, . . . , M−1}, for example, are assigned in good order to M×2 data units of operation of M processor elements 4.

FIG. 5B is different from FIG. 4B in which an identical PE number is assigned to the data units of operation included in a same processor element in FIG. 5B while different PE numbers are assigned to the data units of operation included in an identical processor element in FIG. 4B.

Next, FIG. 6A is a drawing showing a logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition A. FIG. 6A is basically same as FIG. 4A. In FIG. 6A, the data units of operation and the processor elements 4 have a one-to-one relation, and therefore the PE numbers {0, 1, 2, . . . , M−1}, for example, are assigned in good order to M data units of operation of M photoconductor elements 4. "M" corresponds to any natural number greater than 1.

FIG. 6B is a drawing showing yet another logical configuration of the PE numbers of the processor elements 4 provided to the SIMD microprocessor 2 according to this example embodiment of the present patent specification. This logical configuration of the PE numbers of the processor elements 4 corresponds to the SIMD microprocessor 2 under the above-described Operation Condition B. In FIG. 6B, the PE numbers {0, 1, 2, . . . , 2×M−1}, for example, are assigned in good order to M×2 data units of operation of M processor elements 4.

In FIG. 6B, for example, respective PE numbers are assigned to a first unit of two data units of operation included in each single processor element 4 through the entire processor elements 4 from the 1st processor element 4 to the Mth processor element 4. After the assignment of PE numbers to the first data units of the entire processor elements 4 has been completed, respective PE numbers starting from a PE number following the last assigned PE number are assigned to the rest of the data units or second data units of the two data units of operation included in each single processor element 4 through the entire processor elements 4. That is, a PE number immediately after the PE number assigned to the first data unit of the Mth processor element 4 may be assigned to the second data unit of the 1st processor element 4. More specifically, as shown in FIG. 6B, the PE number "PE0" may be assigned to the first data unit of operation of the 1st processor element 4, the PE number "PE1" may be assigned to the first data unit of operation of the 2nd processor element 4, the PE number "PE2" may be assigned to the first data unit of operation of the 3rd processor element 4, and the PE number "PE(M−1)" may be assigned to the first data unit of operation of the Mth processor element 4. Further, the PE number "PE(M)" may be assigned to the second data unit of operation of the 1st processor element 4, the PE number "PE(M+1)" may be assigned to the second data unit of operation of the 2nd processor element 4, the PE number "PE(M+2)" may be assigned to the second data unit of operation of the 3rd processor element 4, and the PE number "PE(2×M−1)" may be assigned to the second data unit of operation of the Mth processor element 4.

Next, referring to FIG. 7, a detailed configuration of a SIMD microprocessor 2a according to an example embodiment of this patent specification is described. Similar to the SIMD microprocessor 2 of FIG. 1, the SIMD microprocessor 2a may be provided in an image processing apparatus such as the image processing apparatus 100.

Components and numbers corresponding to those of the SIMD microprocessor 2 according to the example embodiment shown in FIG. 2 are denoted by the same reference numerals and descriptions thereof are omitted or summarized. Although not particularly described, configurations of the SIMD microprocessor 2a and operations that are not particularly described in this example embodiment are the same as those of the SIMD microprocessor 2 of the example embodiment previously described with reference to FIG. 2.

The SIMD microprocessor 2a shown in FIG. 7 further includes PE number generators 66. Each of the PE number generators 66 is provided to the same level of the 16-bit registers 8 and 16 included in each processor element 4. The PE number generators 66 are controlled by the global processor 30. According to the control of the global processor 30, the PE number generators 66 may generate the PE numbers as shown in FIGS. 4A through 6B and output to the respective register buses 10.

When the SIMD microprocessor 2a is under the above-described Operation Condition A, the entire register buses 10 may be dedicated to the 16-bit arithmetic operations. Therefore, PE numbers from "0" to "$2^{16}-1$" can be generated logically.

By contrast, when the SIMD microprocessor 2a is under the above-described Operation Condition B, each of the 16-bit register bus 10 is divided into two groups of data, one of which using upper 8 bit part and the other of which using lower 8 bit part. The group of data using the upper 8 bit part and the group of data using the lower 8 bit part are respectively assigned to respective data units of operation included in a single processor element 4. Therefore, PE numbers from "0" to "$2^8-1$" can be generated logically.

Figure 8:
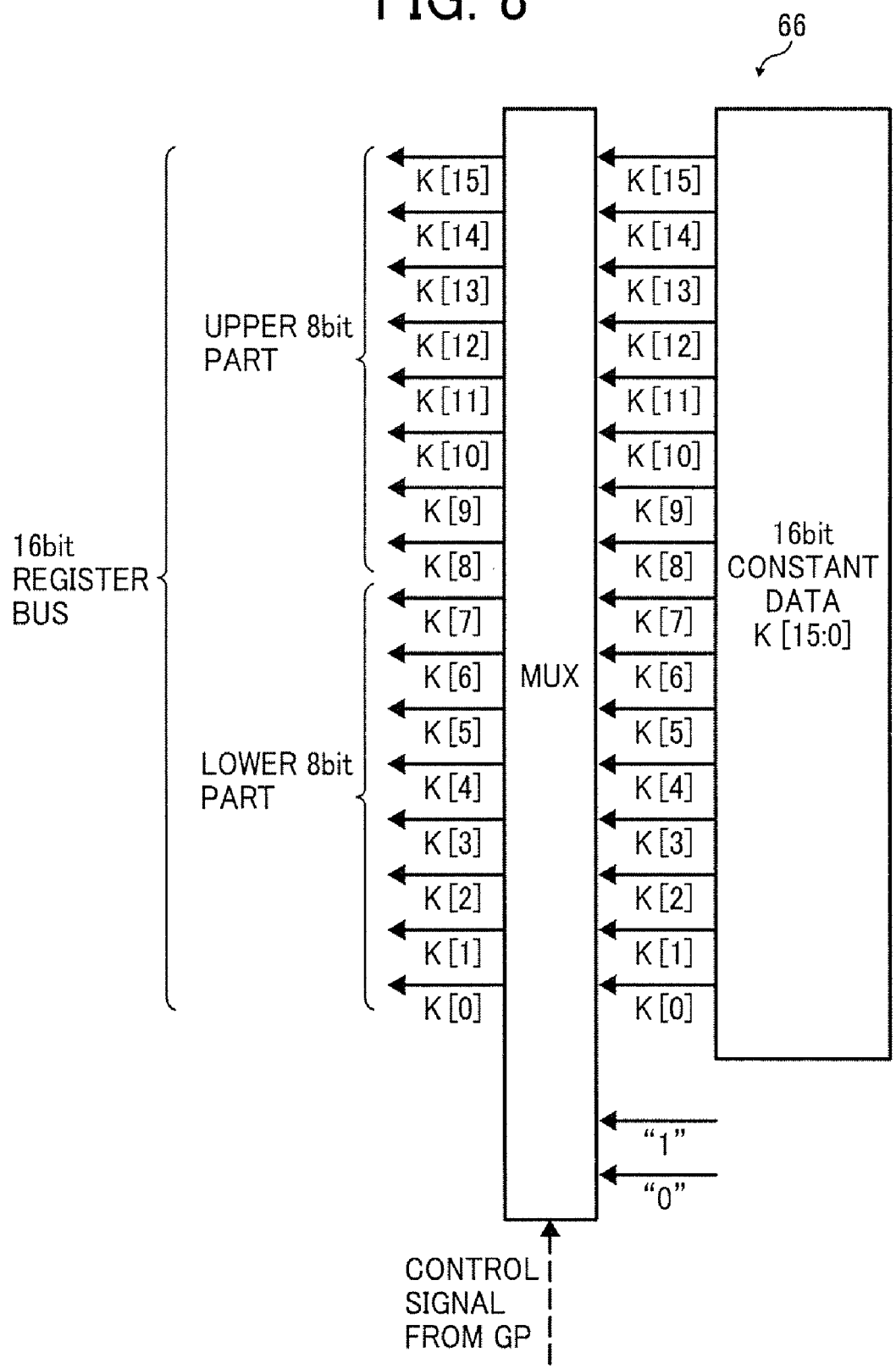
FIG. 8 is an example configuration of a PE number generation circuit and respective partial operations executed in the SIMD microprocessor of FIG. 7.
Figure 9:
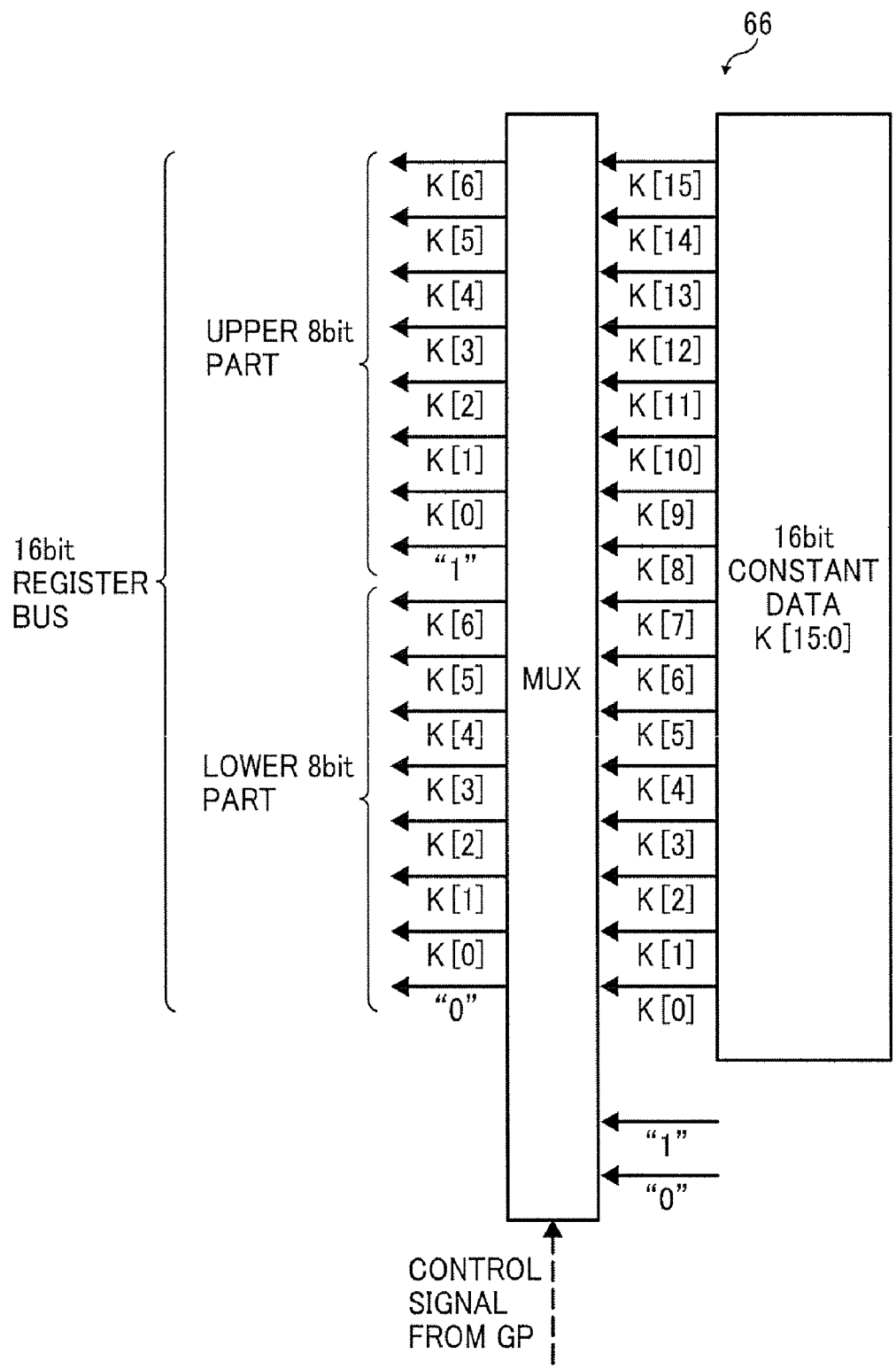
FIG. 9 is an example configuration of a PE number generation circuit and respective partial operations executed in the SIMD microprocessor of FIG. 7.
Figure 10:
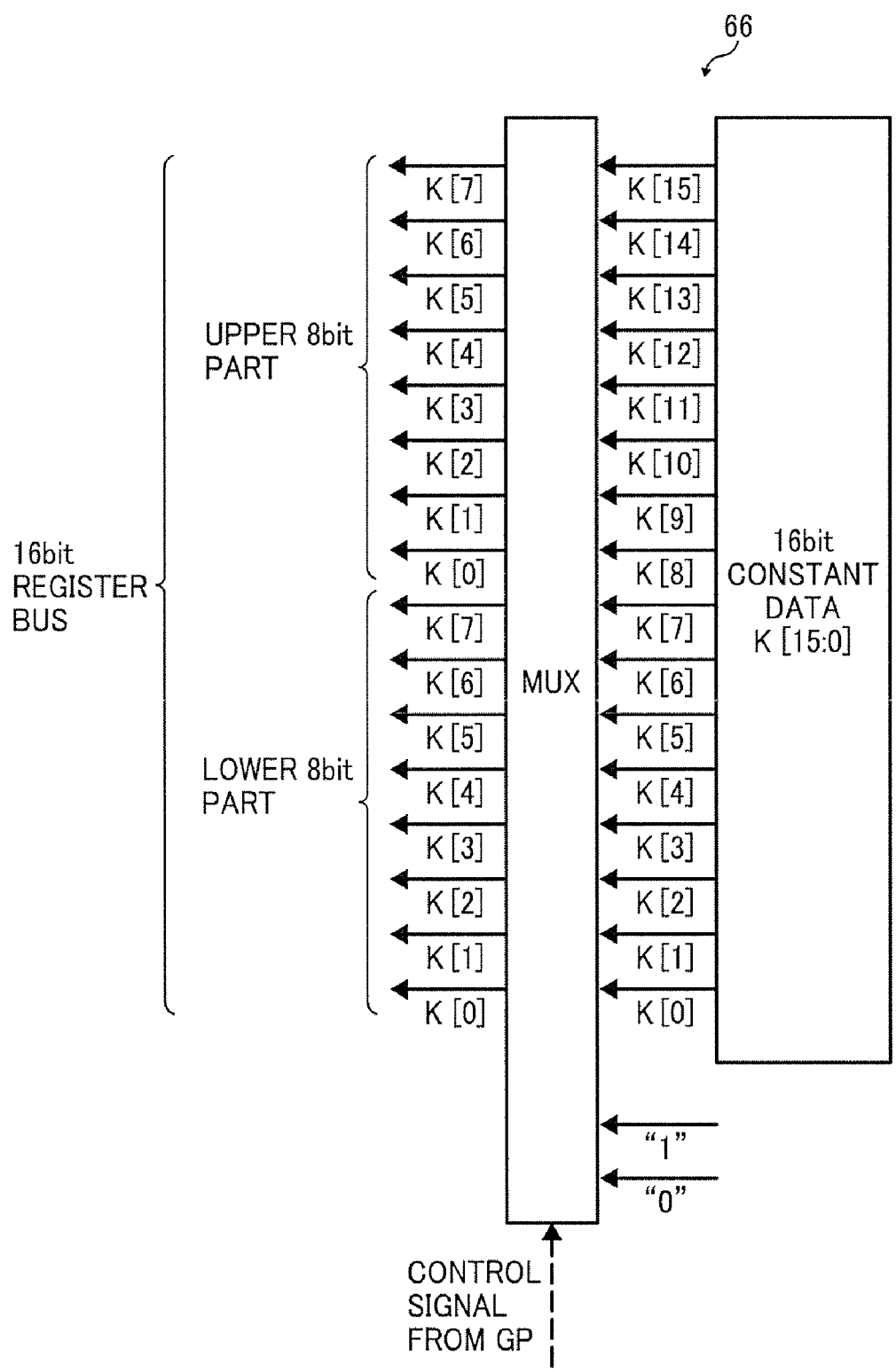
FIG. 10 is an example configuration of a PE number generation circuit and respective partial operations executed in the SIMD microprocessor of FIG. 7.

Next, referring to FIGS. 8, 9, and 10, example configurations of the PE number generation circuit 66 and respective partial operations executed in the SIMD microprocessor 2a are described according to this example embodiment of the present patent specification.

The PE number generator 66 shown in FIGS. 8 through 10 includes a single 16-bit constant data K and a single multiplexer (shown as "MUX"). The single multiplexer may be controlled by the global processor 30.

When the SIMD microprocessor 2a is under the above-described Operation Condition A, where the logical configuration of the processor elements 4 corresponds to FIGS. 4A, 5A, and 6A, the PE number generator 66 may output 16-bit constant data K to the 16-bit register bus 10 as shown in FIG. 8.

When the SIMD microprocessor 2a is under the above-described Operation Condition B, where the logical configuration of the processor elements 4 corresponds to FIG. 4B, the PE number generator 66 may output data 2K to a lower 8 bit part of the 16-bit register bus 10 and data 2K+1 to an upper 8 bit part of the 16-bit register bus 10. "Data 2K" corresponds to lower 8-bit data of values shifting the 16-bit constant data K to the left side by 1 bit, and "data 2K+1" corresponds to the above-described lower 8-bit data added by data 1 that is data having the least significant bit (1 bit). This arithmetic operation is shown in FIG. 9.

When the SIMD microprocessor 2a is under the above-described Operation Condition B, where the logical configuration of the processor elements 4 corresponds to FIG. 5B, the PE number generator 66 may output the lower 8 bits of the 16-bit constant data K to both the lower 8 bit part and the upper 8 bit part of the 16-bit register bus 10. This arithmetic operation is shown in FIG. 10.

When the SIMD microprocessor 2a is under the above-described Operation Condition B, where the logical configuration of the processor elements 4 corresponds to FIG. 6B, it is controlled that an offset value corresponding to the total number of processor elements 4 is added to the second data unit of operation of an identical single processor element. This arithmetic operation is not shown in FIGS. 8 through 10.

Figure 11:
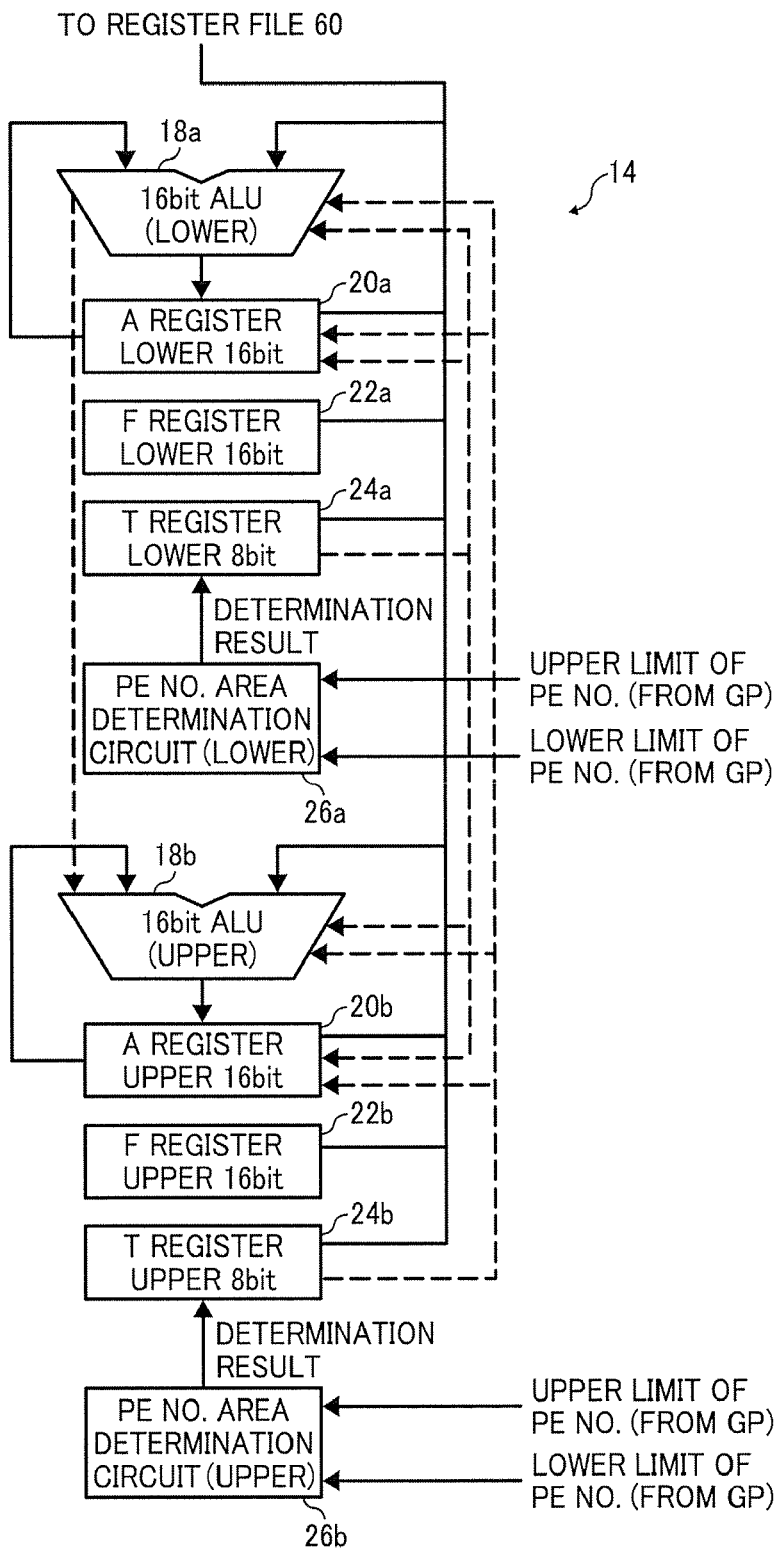
FIG. 11 is a detailed configuration of an arithmetic part of the processor element included in a SIMD microprocessor according to an example embodiment of the patent specification.

Next, referring to FIG. 11, a detailed configuration of the arithmetic part 14 of the processor element 4 included in a SIMD microprocessor 2b according to an example embodiment of this patent specification is described. Similar to the SIMD microprocessor 2 of FIG. 1 and the SIMD microprocessor 2a of FIG. 7, the SIMD microprocessor 2b may be provided in an image processing apparatus such as the image processing apparatus 100.

The configuration of the SIMD microprocessor 2b is substantially same as the SIMD microprocessor 2 of FIG. 2 and the SIMD microprocessor of FIG. 7. Components and numbers corresponding to those of the SIMD microprocessor 2 according to the example embodiment shown in FIG. 2 are denoted by the same reference numerals and descriptions thereof are omitted or summarized. Although not particularly described, configurations of the SIMD microprocessor 2b and operations that are not particularly described in this example embodiment are the same as those of the SIMD microprocessor 2 of the example embodiment previously described with reference to FIG. 2.

The arithmetic part 14 of the single processor element 4 shown in FIG. 11 includes a lower PE number area determination circuit 26a, an upper PE number area determination circuit 26b, a lower execution condition T register 24a, and an upper execution condition T register 24b.

A corresponding one of the lower PE number area determination circuit 26a and the upper PE number area determination circuit 26b may serve as a determination unit and be provided per data unit of operation.

The lower PE number area determination circuit 26a may compare a lower limit PE number indicating and specifying an area that is input from the global processor 30 by an immediate data value with a PE number assigned per data unit of operation of the processor element 4 according to the above-described Operation Condition A or the above-described Operation Condition B. The result of the above-described comparison may be reflected to the lower execution condition T register 24a. The lower execution condition T register 24a may be provided per data unit of operation of each processor element for operation.

Similarly, the upper PE number area determination circuit 26b may compare an upper limit PE number indicating and specifying an area that is input from the global processor 30 by an immediate data value with a PE number assigned per data unit of operation of the processor element 4 according to the above-described Operation Condition A or the above-described Operation Condition B. The results of the above-described comparison may be reflected to the upper execution condition T register 24b. The upper execution condition T register 24b may be provided per data unit of operation of each processor element for operation.

The lower 16-bit ALU 18a and the upper 16-bit ALU 18b provided to each single processor element may determine whether the arithmetic operation is executed or not, according to the value of the lower 8-bit execution condition T register 24a and the upper 8-bit execution condition T register 24b, respectively. Therefore, the area to execute or not to execute the arithmetic operation can be designated at the level of each data unit of operation of the single processor element 4.

In the SIMD microprocessor 2b including the arithmetic part 14 as shown in FIG. 11, even when a single processor element 4 is provided with only one data unit of operation, the single processor element 4 may include both the lower PE number area determination circuit 26a and the upper PE number area determination circuit 26b. In this case, however, it is only necessary that the lower PE number area determination circuit 26a and the upper PE number area determination circuit 26b are controlled to perform an operation identical to each other.

Figure 12:
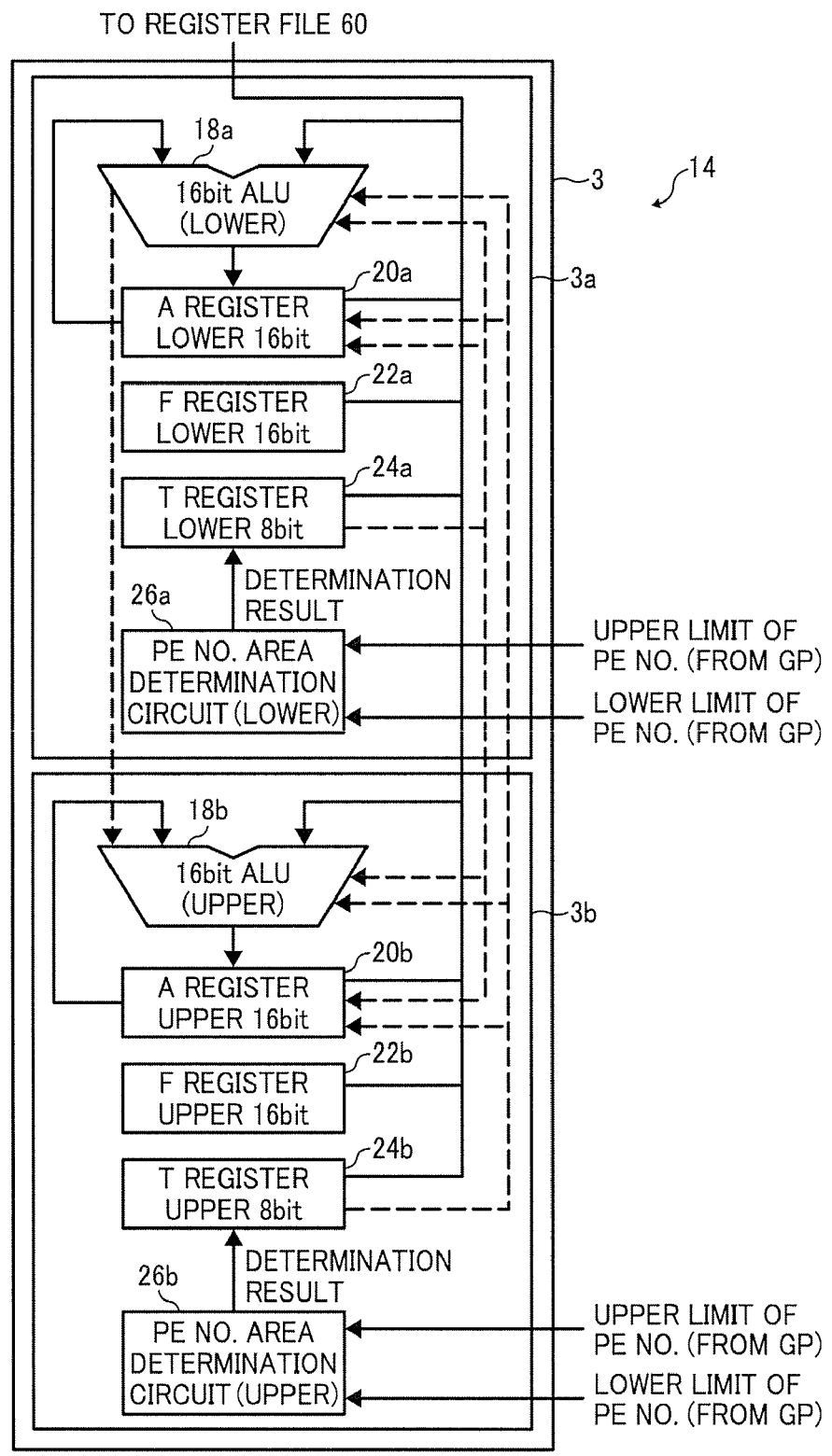
FIG. 12 is a detailed configuration of an arithmetic part of the processor element included in a SIMD microprocessor according to an example embodiment of the patent specification.

Details of the above-described control is described with reference to FIG. 12 showing a schematic configuration of the processor element 4 according to this example embodiment of the present patent specification.

The SIMD microprocessor 2b with reference to FIG. 12 may be applicable for executing the operation under the above-described Operation Condition A and the above-described Operation Condition B corresponding to the logical configuration of the processor element 4 in FIGS. 4A, 4B, 5A, and 5B. The SIMD microprocessor 2b with reference to FIG. 12 may include an operation unit set 3 having a lower operation unit 3a and an upper operation unit 3b. Therefore, the SIMD microprocessor 2b of FIG. 12 may be configured to reduce the respective sizes of the lower PE number area determination circuit 26a and the upper PE number area determination circuit 26b provided per data unit of operation of the processor element 4.

For example, while having the PE number "PE2" in FIGS. 4A and 5A, the 3rd processor element 4 may have the PE number "PE4" assigned to the lower operation unit 3a and the PE number "PE5" assigned to the upper operation unit 3b in FIG. 4B. That is, in FIG. 4B, the lower PE number area determination circuit 26a may compare the lower limit PE number that is input from the global processor 30 with the constant value to determine whether or not the constant value is within the PE number area. Similarly, the upper PE number area determination circuit 26b may compare the upper limit PE number that is input from the global processor 30 with the constant value to determine whether or not the constant value is within the PE number area.

In the lower operation unit 3a and the upper operation unit 3b shown in FIG. 12, the constant values may be provided corresponding to the PE number of FIG. 4B. That is, when the processor element 4 shown in FIG. 12 has the PE number "PE2" same as the condition corresponding to the logical configuration of the processor elements 4 in FIG. 4A or FIG. 5A, for example, the PE number "PE4" may be assigned to the constant value of the lower PE number area determination circuit 26a associated with the lower ALU 18a and the PE number "PE5" may be assigned to the constant value of the upper PE number area determination circuit 26b associated with the upper ALU 18b.

According to the above-described operation, the SIMD microprocessor 2b may be applicable to the condition corresponding to the logical configuration of the processor elements 4 in FIG. 4B.

Next, a description is given of an operation that is applicable to the condition corresponding to the logical configuration of the processor elements 4 shown in FIG. 4A or FIG. 5A.

In the SIMD microprocessor 2b shown in FIG. 12, the upper limit PE number and the lower limit PE number that are input from the global processor 30 may be multiplied by two to be provided to the lower PE number area determination circuit 26a and the upper PE number area determination circuit 26b, respectively.

Further, at this time, the upper PE number area determination circuit 26b associated with the upper ALU 18b may be configured not to compare the least significant bit (1 bit). That is, the upper PE number area determination circuit 26b may ignore the comparison result of the least significant bit (1 bit).

For example, when the PE number "PE4" is provided to the constant value of the lower PE number area determination circuit 26a associated with the lower ALU 18a of the processor element 4 and the PE number "PE5" is provided to the constant value of the upper PE number area determination circuit 26b associated with the upper ALU 18b of the processor element 4 in FIG. 12, both the lower PE number area determination circuit 26a associated with the lower ALU 18a and the upper PE number area determination circuit 26b associated with the upper ALU 18b may determine whether the constant value "4" is substantially provided within a selection area by data from the global processor 30.

That is, both the lower PE number area determination circuit 26a and the upper PE number area determination circuit 26b may use a value obtained by multiplying the actual PE number "2" by two under the condition of the logical configurations in FIG. 4A or FIG. 5A. Accordingly, the upper limit PE number and the lower limit PE number that are input from the global processor 30 may also apply a value multiplied by two.

In the above-described example embodiments, a specific PE number (for example, the PE number "PE2") was used as an example to make the description easy to understand. However, the same description is applicable to any possible PE number. Further, any possible PE number is applicable under the condition corresponding to the logical configuration of FIG. 5B, which is also same as described above.

This invention may be conveniently implemented using a conventional general-purpose digital computer programmed according to the teachings of the present specification, as will be apparent to those skilled in the computer arts. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the art.

Numerous additional modifications and variations are possible in light of the above teachings. It is therefore to be understood that, within the scope of the appended claims, the disclosure of this patent specification may be practiced otherwise than as specifically described herein.

What is claimed is:

1. A SIMD microprocessor, comprising:
   a global processor; and
   multiple processor elements controlled by the global processor, each single processor element thereof including multiple operation units,
   the global processor controlling to uniformly change a configuration of the multiple operation units in the single processor element to determine a number of data units of operation according to the multiple operation units either operated individually or in cooperation with each other in the single processor element and a width of data processed per data unit of operation performed in the single processor element,
   wherein the global processor assigns an identical processor element number to the multiple operation units included in the single processor element when the multiple operation units cooperate with each other in the single processor element to execute a single operation and the global processor assigns either a unique or an identical processor element number to each operation unit included in the single processor element when the multiple operation units operate individually in the single processor element to execute a different operation respectively.

2. The SIMD microprocessor according to claim 1, wherein the processor element number is generated as one of the data processed per data unit of operation performed in the single processor element.

3. The SIMD microprocessor according to claim 1, wherein the assigned processor element number is used to determine an area of the respective data unit of operation of the single processor element used to execute the operation, the area to execute the operation being determined according to a designation specified by the global processor.

4. A SIMD microprocessor, comprising:
a global processor; and
multiple processor elements controlled by the global processor, each single processor element thereof including multiple operation units,
the global processor controlling to uniformly change a configuration of the multiple operation units in the single processor element to determine a number of data units of operation according to the multiple operation units either operated individually or in cooperation with each other in the single processor element and a width of data processed per data unit of operation performed in the single processor element,
a processor element number being assigned per data unit of operation to the single processor element to use for executing an operation,
wherein the assigned processor element number is used to determine an area of the respective data unit of operation of the single processor element used to execute the operation, the area to execute the operation being determined according to a designation specified by the global processor, and
wherein the single processor element includes two operation units,
the SIMD microprocessor selectively performing one of a first processor element numbering, a second processor element numbering, and a third processor element numbering controlled by the global processor,
the first processor element numbering assigning an identical processor element number to the two operation units included in the single processor element either in ascending order or in descending order with respect to a neighboring processor element, when two data units of operation cooperate with each other in the single processor element to execute an operation,
the second processor element numbering assigning first processor element numbers different from each other to the two operation units included in the single processor element either in ascending order or in descending order with respect to the two operation units and then assigning second processor element numbers different from each other and consecutive to the first processor element numbers to two operation units included in a neighboring single processor element either in ascending order or in descending order with respect to the two operation units in the neighboring single processor element, when two data units of operation operate individually in the single processor element to execute an operation,
the third processor element numbering assigning two processor element numbers identical to each other to the two operation units included in the single processor element either in ascending order or in descending order with respect to a neighboring processor element, when two data units of operation operate individually in the single processor element to execute an operation.

5. The SIMD microprocessor according to claim 4, wherein each of the two operation units included in the single processor element includes a determination unit configured to determine whether the processor element number assigned to the single processor element is provided within a selection area specified by the global processor,
the processor element number being assigned to the two operation units included in the single processor element according to the second processor element numbering,
when executing either the first processor element numbering or the third processor element numbering, a designated value residing within the selection area sent from the global processor being multiplied by two to provide a resulting value to each of the two operation units included in the single processor element, and the determination unit provided to each of the two operation units included in the single processor element ignoring a least significant bit.

6. An image processing apparatus, comprising:
a SIMD microprocessor including:
a global processor; and
multiple processor elements controlled by the global processor, each single processor element thereof including multiple operation units,
the global processor controlling to uniformly change a configuration of the multiple operation units in the single processor element to determine a number of data units of operation according to the multiple operation units either operated individually or in cooperation with each other in the single processor element and a width of data processed per data unit of operation performed in the single processor element,
wherein the global processor assigns an identical processor element number to the multiple operation units included in the single processor element when the multiple operation units cooperate with each other in the single processor element to execute a single operation and the global processor assigns either a unique or an identical processor element number to each operation unit included in the single processor element when the multiple operation units operate individually in the single processor element to execute a different operation respectively.

7. The image processing apparatus according to claim 6, wherein the processor element number is generated as one of the data processed per data unit of operation performed in the single processor element.

8. The image processing apparatus according to claim 6, wherein the assigned processor element number is used to determine an area of the respective data unit of operation of the single processor element used to execute the operation, the area to execute the operation being determined according to a designation specified by the global processor.

9. An image processing apparatus, comprising a SIMD microprocessor including:
a global processor; and
multiple processor elements controlled by the global processor, each single processor element thereof including multiple operation units,
the global processor controlling to uniformly change a configuration of the multiple operation units in the single processor element to determine a number of data units of operation according to the multiple operation units either operated individually or in cooperation with each other in the single processor element and a width of data processed per data unit of operation performed in the single processor element, a processor element number being assigned per data unit of operation to the single processor element to use for executing an operation, wherein the assigned processor element number is used to determine an area of the respective data unit of operation of the single processor element used to execute the operation, the area to execute the operation being determined according to a designation specified by the global processor, and wherein the single processor element includes two operation units, the SIMD microprocessor selectively performing one of a first processor element numbering, a second processor element numbering, and a third processor element numbering controlled by the global processor, the first processor element numbering assigning an identical processor element number to the two operation units included in the single processor element either in ascending order or in descending order with respect to a neighboring processor element, when two data units of operation cooperate with each other in the single processor element to execute an operation, the second processor element numbering assigning first processor element numbers different from each other to the two operation units included in the single processor element either in ascending order or in descending order with respect to the two operation units and then assigning second processor element numbers different from each other and consecutive to the first processor element numbers to two operation units included in a neighboring single processor element either in ascending order or in descending order with respect to the two operation units in the neighboring single processor element, when two data units of operation operate individually in the single processor element to execute an operation, the third processor element numbering assigning two processor element numbers identical to each other to the two operation units included in the single processor element either in ascending order or in descending order with respect to a neighboring processor element, when two data units of operation operate individually in the single processor element to execute an operation.

10. The image processing apparatus according to claim 9, wherein each of the two operation units included in the single processor element includes a determination unit configured to determine whether the processor element number assigned to the single processor element is provided within a selection area specified by the global processor, the processor element number being assigned to the two operation units included in the single processor element according to the second processor element numbering, when executing either the first processor element numbering or the third processor element numbering, a designated value residing within the selection area sent from the global processor being multiplied by two to provide a resulting value to each of the two operation units included in the single processor element, and the determination unit provided to each of the two operation units included in the single processor element ignoring a least significant bit.

11. An image processing method performed in a SIMD microprocessor included in an image processing apparatus, the SIMD microprocessor including a global processor and multiple processor elements controlled by the global processor, each single processor element thereof including multiple operation units, the image processing method comprising:

uniformly changing a configuration of the multiple operation units in the single processor element;

determining a number of data units of operation according to the multiple operation units either operated individually or in cooperation with each other in the single processor element and a width of data processed per data unit of operation performed in the single processor element;

assigning an identical processor element number to the multiple operation units included in the single processor element when the multiple operation units cooperate with each other in the single processor element to execute a single operation;

assigning either a unique or an identical processor element number to each operation unit included in the single processor element when the multiple operation units operate individually in the single processor element to execute .a different operation respectively; and each data unit of operation executing an operation based on the assigned processor element number.

12. The image processing method according to claim 11, further comprising:

generating the processor element number as one of the data processed per data unit of operation performed in the single processor element.

13. The image processing method according to claim 11, further comprising:

using the assigned processor element number to determine an area of the respective data unit of operation of the single processor element used to execute the operation, the area to execute the operation being determined according to a designation specified by the global processor.

14. An image processing method performed in a SIMD microprocessor included in an image processing apparatus, the SIMD microprocessor including a global processor and multiple processor elements controlled by the global processor, each single processor element thereof including multiple operation units, the image processing method comprising:

uniformly changing a configuration of the multiple operation units in the single processor element;

determining a number of data units of operation according to the multiple operation units either operated individually or in cooperation with each other in the single processor element and a width of data processed per data unit of operation performed in the single processor element;

assigning a processor element number per data unit of operation to the single processor element;

executing an operation using the assigned processor element number;

using the assigned processor element number to determine an area of the respective data unit of operation of the single processor element used to execute the operation, the area to execute the operation being determined according to a designation specified by the global processor; and selectively performing one of a first assigning (1), a second assigning (2), and a third assigning (3) to the single processor element including two operation units under a control by the global processor, (1) assigning an identical processor element number to the two operation units included in the single processor element either in ascending order or in descending order with respect to a neighboring processor element, when two data units of operation cooperate with each other in the single processor element to execute an operation, p1

(2) assigning first processor element numbers different from each other to the two operation units included in the single processor element either in ascending order or in descending order with respect to the two operation units and then assigning second processor element numbers different from each other and consecutive to the first processor element numbers to two operation units included in a neighboring single processor element either in ascending order or in descending order with respect to the two operation units in the neighboring single processor element, when two data units of operation operate individually in the single processor element to execute an operation, and (3) assigning two processor element numbers identical to each other to the two operation units included in the single processor element either in ascending order or in descending order with respect to a neighboring processor element, when two data units of operation operate individually in the single processor element to execute an operation.

15. The image processing method according to claim 14, further comprising:

determining whether the processor element number assigned to the single processor element is provided within a selection area specified by the global processor, and assigning the processor element number to the two operation units included in the single processor element according to the second assigning (2).

16. The image processing method according to claim 14, further comprising, when performing either the first assigning (1) or the third assigning (3):

multiplying a designated value residing within the selection area sent from the global processor by two to provide a resulting value to each of the two operation units included in the single processor element; and ignoring a least significant bit.

* * * * *